(12) United States Patent
Liao

(10) Patent No.: US 11,258,851 B2
(45) Date of Patent: Feb. 22, 2022

(54) CONSENSUS NODE CHANGING METHOD AND RELATED APPARATUS BASED ON HONEY BADGER BYZANTINE FAULT TOLERANCE CONSENSUS MECHANISM

(71) Applicant: ALIPAY (HANGZHOU) INFORMATION TECHNOLOGY CO., LTD., Zhejiang (CN)

(72) Inventor: Xiaojun Liao, Hangzhou (CN)

(73) Assignee: ALIPAY (HANGZHOU) INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/352,210

(22) Filed: Jun. 18, 2021

(65) Prior Publication Data

US 2021/0314392 A1    Oct. 7, 2021

(30) Foreign Application Priority Data

Jul. 3, 2020    (CN) .......................... 202010630142.1

(51) Int. Cl.
*G06F 15/16* (2006.01)
*G06F 9/54* (2006.01)
(Continued)

(52) U.S. Cl.
CPC ........ *H04L 67/108* (2013.01); *H04L 67/1046* (2013.01); *H04L 67/1048* (2013.01); *H04L 67/1059* (2013.01); *H04L 67/26* (2013.01)

(58) Field of Classification Search
CPC .................................................... H04L 67/108
(Continued)

(56) References Cited

U.S. PATENT DOCUMENTS 6,671,821 B1   12/2003   Castro et al.
8,311,991 B2   11/2012   Aggarwal et al.
(Continued)

FOREIGN PATENT DOCUMENTS

CN    107579848 A    1/2018
CN    108667614 A   10/2018
(Continued)

OTHER PUBLICATIONS

First Search for Chinese Application No. 202010630142.1 dated Aug. 14, 2020.
(Continued)

*Primary Examiner* — Hamza N Algibhah

(57) ABSTRACT

Embodiments of this specification provide a consensus node changing method and apparatus based on a Honey Badger Byzantine Fault Tolerance (BFT) consensus mechanism. The method includes: when receiving a transaction for changing a blockchain's consensus node, executing, by a consensus node of the blockchain, the transaction to trigger a smart contract to update a consensus node configuration list of the blockchain, where the consensus node configuration list includes serial numbers allocated to consensus nodes based on a serial number allocation rule specified by the smart contract; associating, by the consensus node based on serial numbers of consensus nodes in the updated consensus node configuration list, another consensus node of the blockchain with at least two state machines configured in the consensus node.

20 Claims, 3 Drawing Sheets

---

When receiving a transaction for changing a blockchain's consensus node, a consensus node of the blockchain executes the transaction to trigger a smart contract to update a consensus node configuration list of the blockchain, where the consensus node configuration list includes serial numbers allocated to consensus nodes of the blockchain based on a serial number allocation rule specified by the smart contract    — S102

The consensus node of the blockchain associates, based on serial numbers of consensus nodes recorded in the updated consensus node configuration list, other consensus nodes of the blockchain with at least two state machines configured in the consensus node, where each of the state machines is provided with states corresponding to a consensus phase in the Honey Badger BFT consensus mechanism and configured to perform state switching based on a control signal to perform a consensus operation specified by the consensus phase corresponding to a current state of the state machine    — S104

The consensus node of the blockchain processes, based on the at least two state machines, consensus proposals initiated by one or more of the other consensus nodes associated with the state machines    — S106

(51) Int. Cl.
*H04L 29/06* (2006.01)
*H04L 67/1074* (2022.01)
*H04L 67/1042* (2022.01)
*H04L 67/55* (2022.01)

(58) Field of Classification Search
USPC .......................................................... 709/223
See application file for complete search history.

(56) References Cited

U.S. PATENT DOCUMENTS

| | | | |
|---|---|---|---|
| 10,616,324 B1 | 4/2020 | Kaddoura et al. | |
| 10,643,288 B2 | 5/2020 | Orsini et al. | |
| 10,684,925 B2 | 6/2020 | Tang | |
| 10,812,274 B2 | 10/2020 | Back et al. | |
| 10,831,452 B1 * | 11/2020 | Hunter | G06F 16/9024 |
| 2010/0174802 A1 | 7/2010 | Chan et al. | |
| 2012/0110186 A1 | 5/2012 | Kapur et al. | |
| 2013/0110781 A1 | 5/2013 | Golab et al. | |
| 2017/0116693 A1 | 4/2017 | Rae et al. | |
| 2019/0020729 A1 * | 1/2019 | Chen | H04L 67/10 |
| 2019/0098080 A1 | 3/2019 | Bermudez et al. | |
| 2019/0129895 A1 | 5/2019 | Middleton et al. | |
| 2019/0188089 A1 | 6/2019 | Mueller et al. | |
| 2019/0251199 A1 | 8/2019 | Klianev | |
| 2019/0327097 A1 | 10/2019 | Tang | |
| 2019/0358515 A1 | 11/2019 | Tran et al. | |
| 2020/0162264 A1 | 5/2020 | Zamani et al. | |
| 2020/0235947 A1 * | 7/2020 | Baykaner | H04L 9/3297 |
| 2020/0274694 A1 | 8/2020 | Wood et al. | |
| 2020/0412766 A1 * | 12/2020 | Gu | H04L 63/20 |
| 2021/0019444 A1 | 1/2021 | Miller | |
| 2021/0073647 A1 * | 3/2021 | Hunter | G06F 17/18 |
| 2021/0099283 A1 * | 4/2021 | Schvey | G06F 9/466 |

FOREIGN PATENT DOCUMENTS

| | | |
|---|---|---|
| CN | 109309723 A | 2/2019 |
| CN | 111130879 A | 5/2020 |

OTHER PUBLICATIONS

Extended European Search Report for European Application No. 21 178 984.7 dated Nov. 29, 2021.

* cited by examiner

CONSENSUS NODE CHANGING METHOD AND RELATED APPARATUS BASED ON HONEY BADGER BYZANTINE FAULT TOLERANCE CONSENSUS MECHANISM

CROSS REFERENCE TO RELATED APPLICATIONS

The present application is based on and claims priority to and benefits of Chinese Patent Application No. 202010630142.1, filed with the CNIPA (China National Intellectual Property Administration) of the People's Republic of China on Jul. 3, 2020, the entire contents of which are incorporated herein by reference in the entirety.

TECHNICAL FIELD

This file relates to the field of data processing technologies, and in particular, to a consensus node changing method and a related apparatus based on a Honey Badger Byzantine Fault Tolerance consensus mechanism.

BACKGROUND

In a blockchain system, the consistency of consensus verification may be effectively ensured by using a common Byzantine Fault Tolerance (BFT) consensus protocol, but no related design has been made for dynamic changes of consensus nodes. In a blockchain system, if one consensus node is added or removed, the system needs to be shut down to modify related parameter configurations, and then the system is restarted. Apparently, such a cumbersome process is disruptive to the system performance and increases system downtime which should be avoided.

As an asynchronous network BFT consensus protocol, Honey Badger BFT does not depend on any time assumption about a network environment, and has a higher processing efficiency compared with a conventional Practical Byzantine Fault Tolerance (PBFT) consensus protocol. Therefore, the Honey Badger BFT is accepted by increasingly more institutions. Under this background, it is necessary to provide a technical solution for dynamically changing a consensus node without shutting down a blockchain system in the context of the Honey Badger BFT consensus protocol.

SUMMARY

An objective of the embodiments of this specification is to provide a consensus node changing method and a related apparatus based on a Honey Badger Byzantine Fault Tolerance (BFT) consensus mechanism, to dynamically process changes of consensus nodes for a Honey Badger BFT consensus protocol without shutting down the blockchain system.

In order to achieve the foregoing objective, embodiments of this specification are implemented in the following manner.

According to a first aspect, a consensus node changing method is provided, including: when receiving a transaction for changing a blockchain's consensus node, executing, by a consensus node of the blockchain, the transaction, to trigger a smart contract to update a consensus node configuration list of the blockchain, where the consensus node configuration list includes serial numbers allocated to consensus nodes of the blockchain based on a serial number allocation rule specified by the smart contract; associating, by the consensus node of the blockchain based on serial numbers of consensus nodes in the updated consensus node configuration list, other consensus nodes of the blockchain with at least two state machines configured in the consensus node, where each of the state machines is configured with states corresponding to a consensus phase in the Honey Badger BFT consensus mechanism and configured to perform state switching based on a control signal to perform a consensus operation specified by the consensus phase corresponding to a current state of the state machine; and processing, by the consensus node of the blockchain based on the at least two state machines, a consensus proposal initiated by one or more of the other consensus nodes associated with the at least two state machines.

According to a second aspect, a consensus node changing apparatus is provided, including: an update module, configured to: when a transaction for changing a blockchain's consensus node is received, control a consensus node of the blockchain to execute the transaction to trigger a smart contract to update a consensus node configuration list of the blockchain, where the consensus node configuration list includes serial numbers allocated to consensus nodes of the blockchain based on a serial number allocation rule specified by the smart contract; an association module, configured to control the consensus node of the blockchain to associate, based on serial numbers of consensus nodes in the updated consensus node configuration list, other consensus nodes of the blockchain with at least two state machines configured in the consensus node, where each of the state machines is configured with states corresponding to a consensus phase in the Honey Badger BFT consensus mechanism and configured to perform state switching based on a control signal to perform a consensus operation specified by the consensus phase corresponding to a current state of the state machine; and a consensus module, configured to control the consensus node of the blockchain to process, based on the at least two state machines, a consensus proposal initiated by one or more of the other consensus nodes associated with the at least two state machines.

According to a third aspect, a consensus node is provided, including: an update module, configured to: when a transaction for changing a blockchain's consensus node is received, execute the transaction, to trigger a smart contract to update a consensus node configuration list of the blockchain, where the consensus node configuration list includes serial numbers allocated to consensus nodes of the blockchain based on a serial number allocation rule specified by the smart contract; an association module, configured to associate, based on serial numbers of consensus nodes in the updated consensus node configuration list, other consensus nodes of the blockchain with at least two state machines configured in the consensus node, where each of the state machines is configured with states corresponding to a consensus phase in the Honey Badger BFT consensus mechanism and configured to perform state switching based on a control signal to perform a consensus operation specified by the consensus phase corresponding to a current state of the state machine; and a consensus module, configured to process, based on the at least two state machines, a consensus proposal initiated by one or more of the other consensus nodes associated with the at least two state machines.

In the solution of the embodiments of this specification, a unique serial number and at least two state machines are allocated to each consensus node; any target consensus node associates with local state machines based on the serial numbers of other consensus nodes and processes, by using the state machines, consensus proposals initiated by one or more of the other consensus nodes associated with the state machines, thereby implementing dynamic changes of consensus nodes without shutting down a blockchain system and ensuring availability of blockchain services.

BRIEF DESCRIPTION OF THE DRAWINGS

To describe the technical solutions in the embodiments of this specification or in the prior art more clearly, the accompanying drawings required for describing the embodiments or the prior art are briefly introduced below. Apparently, the accompanying drawings in the following description show merely some embodiments of this specification, and a person of ordinary skill in the art may still derive other drawings from these accompanying drawings without creative efforts.

DETAILED DESCRIPTION

To enable a person skilled in the art to better understand the technical solutions in this specification, the technical solutions of the embodiments of this specification will be described clearly and thoroughly below with reference to the accompanying drawings of the embodiments of this specification. Apparently, the described embodiments are merely some rather than all of the embodiments of this specification. All other embodiments obtained by a person of ordinary skill in the art based on the embodiments of this specification without creative efforts shall fall within the protection scope of this specification.

As described above, no related design has been made for dynamic changes of consensus nodes in current Byzantine Fault Tolerance (BFT) consensus protocols. In this way, in a blockchain system, if one consensus node is added or removed, the system needs to be shut down to modify related parameter configurations, and then the system is restarted. Apparently, such a cumbersome process is disruptive to the system performance and increases system downtime which should be avoided. As an asynchronous network BFT consensus protocol, Honey Badger BFT has an obvious advantage in efficiency and is accepted by increasingly more institutions. Based on this, this specification provides a technical solution for implementing dynamic changes of consensus nodes for the Honey Badger BFT consensus protocol without shutting down the blockchain system.

Figure 1:
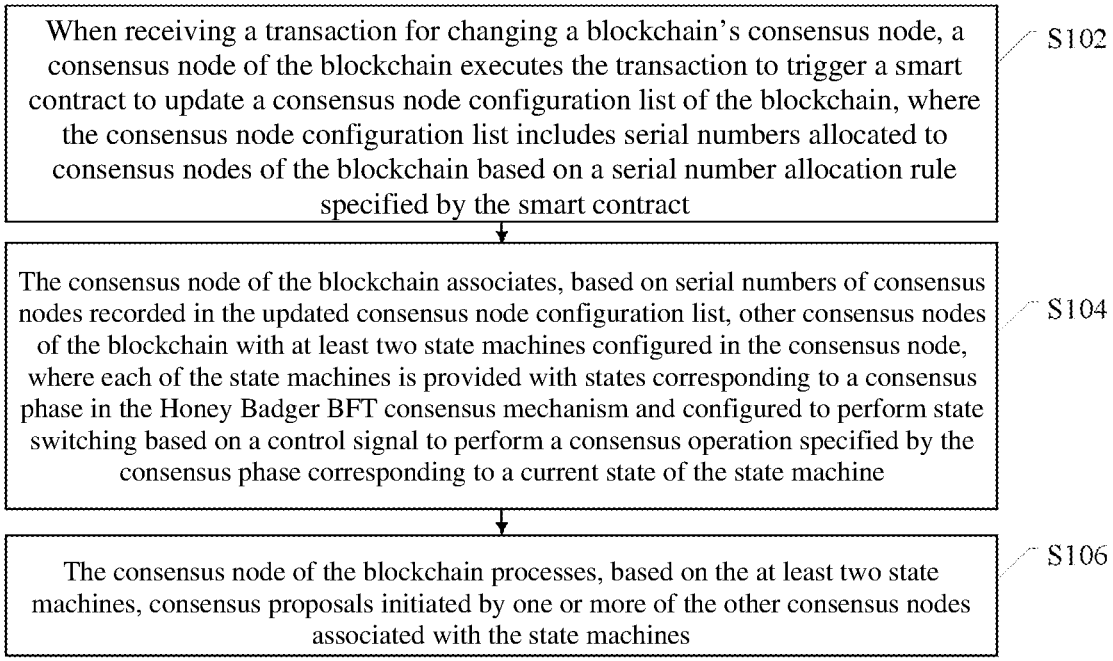
FIG. 1 is a first schematic flowchart of a consensus node changing method based on a Honey Badger BFT consensus mechanism, according to some embodiments of this specification.

FIG. 1 is a flowchart of a consensus node changing method based on a Honey Badger BFT consensus mechanism, according to some embodiments of this specification. The method shown in FIG. 1 may be performed by the following corresponding apparatus and includes the following steps:

S102: When receiving a transaction for changing a blockchain's consensus node, executing, by a consensus node of the blockchain, the transaction, to trigger a smart contract to update a consensus node configuration list of the blockchain, where the consensus node configuration list includes serial numbers allocated to consensus nodes of the blockchain based on a serial number allocation rule specified by the smart contract.

In some embodiments of this specification, each consensus node is configured with a consensus node information base for storing the consensus node configuration list of the blockchain.

If the transaction is used for adding a new consensus node to the blockchain, in this step, the consensus node of the blockchain executes the transaction to trigger the smart contract to configure a corresponding unique serial number for the new consensus node according to the serial number allocation rule and add information about the new consensus node to the consensus node configuration list of the blockchain, where the information about the new consensus node includes an ID and the corresponding serial number of the new consensus node.

If the transaction is used for deleting a consensus node from the blockchain, in this step, the consensus node of the blockchain executes the transaction to trigger the smart contract to delete information about the to-be-deleted consensus node from the consensus node configuration list, and similarly, the information about the to-be-deleted consensus node includes an ID and a corresponding serial number of the to-be-deleted consensus node.

S104: Associating, by the consensus node of the blockchain based on serial numbers of consensus nodes recorded in the updated consensus node configuration list, other consensus nodes of the blockchain with at least two state machines configured in the consensus node (e.g., the two state machines being locally located in the consensus node), where each of the state machines is configured with states corresponding to a consensus phase in the Honey Badger BFT consensus mechanism and configured to perform state switching based on a control signal to perform a consensus operation specified by the consensus phase corresponding to a current state of the state machine. In some embodiments, the other consensus nodes of the blockchain may refer to consensus nodes of the blockchain excluding the consensus node performing S104 and after the transaction for deleting or adding a consensus node is executed. For example, a blockchain has consensus nodes A, B, C, D, and E, and A performs S102-S106. If the transactions is for adding consensus node F, the other consensus nodes may refer to B, C, D, E, and F. If the transactions is for deleting consensus node E, the other consensus nodes may refer to B, C, and D.

In this step, association calculation may be performed on the serial numbers of other consensus nodes for any target consensus node through a preset association algorithm, to determine the other consensus nodes associated with local state machines of the target consensus node. That is, the other consensus nodes associated with state machines of any consensus node depend on allocated serial numbers of the other consensus nodes. Therefore, after a blockchain initiates a consensus node change, consensus nodes of the blockchain need to reconfigure respective state machines.

In some embodiments, the serial number is allocated, according to the serial number allocation rule based on a monotonic increasing principle, to the new consensus node added to the blockchain, and the serial number corresponding to the deleted original consensus node is no longer used. That is, the serial number allocation rule includes not using the serial number corresponding to the deleted consensus node. In this way, in some embodiments, the consensus nodes need to reconfigure the local state machines only when a new consensus node is added to the blockchain.

In some embodiments, the number of state machines configured for any consensus node may be dynamically adjusted according to the number of other consensus nodes in the blockchain. In some embodiments of this specification, the number of consensus nodes in the blockchain is not less than 3, and each consensus node is configured with a number of state machines not less than 2 and not greater than a total number of the consensus nodes in the blockchain.

S106: Processing, by the consensus node of the blockchain based on the at least two state machines (e.g., the state machines that have been configured locally), a consensus proposal initiated by one or more of the other consensus nodes associated with the state machines.

Based on the consensus node changing method shown in FIG. 1, in the solution of the embodiments of this specification, a unique serial number and at least two state machines are allocated to each consensus node; any target consensus node associates with local state machines based on the serial numbers of other consensus nodes and processes, by using the state machines, consensus proposals initiated by one or more of other consensus nodes associated with the state machines, thereby implementing dynamic changes of consensus nodes without shutting down a blockchain system and ensuring availability of blockchain services.

The following describes embodiments of this specification of changing consensus nodes in detail.

In a Honey Badger BFT consensus mechanism, each consensus node needs to initiate a consensus proposal. It is assumed that a blockchain has N consensus nodes. In this case, N consensus proposals are initiated in each round of consensus. Each consensus proposal needs to go through a reliable broadcast (RBC) protocol and a binary agreement (BA) protocol of the Honey Badger BFT. The RBC protocol and the BA protocol both have more than two consensus message types. To improve consensus efficiency, a multi-thread model is introduced for each consensus node in design, and a total number M of threads needs to be greater than or equal to 1 and less than or equal to N. Each thread herein is a state machine and is responsible for processing each consensus proposal message initiated by one or more consensus nodes.

When the Honey Badger BFT protocol is initialized, a number N of consensus nodes, a number M of state machines of each consensus node, and the designation of consensus node(s) for which each state machine is responsible for processing proposal(s) from the designated consensus node(s) are determined. On this basis, to implement dynamic addition/deletion of a consensus node, the issue of association between state machines and consensus nodes needs to be resolved. Based on this, in some embodiments of this specification, a unique serial number needs to be allocated to each node according to a predetermined serial number allocation rule based on a monotonically increasing principle.

Figure 2:
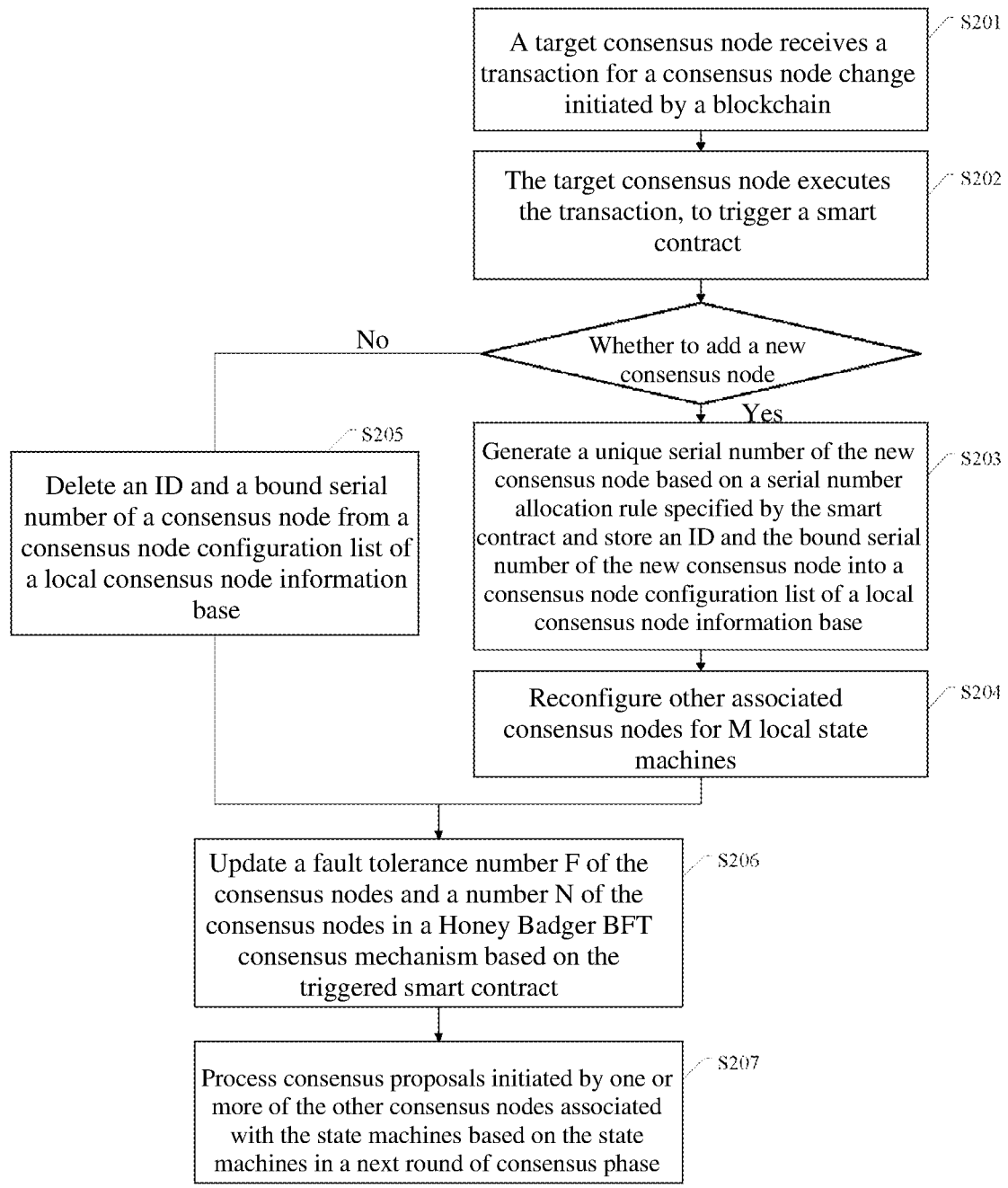
FIG. 2 is a second schematic flowchart of a consensus node changing method based on a Honey Badger BFT consensus mechanism, according to some embodiments of this specification.

As shown in FIG. 2, for a target consensus node, after one or more consensus nodes of a blockchain initiates a consensus node change (the target consensus node is any consensus node that remains after the blockchain completes the consensus node change), steps of an association rule between configured state machines and other consensus nodes include:

S201: Receiving, by a target consensus node, a transaction for changing consensus node initiated by a blockchain.

To prevent the consensus node change from affecting the consensus process, in this step, if the blockchain currently has no consensus round to be performed, the transaction for changing consensus node is initiated; and if the blockchain is currently in a consensus phase, the transaction for changing consensus node may be initiated after the current consensus round is ended.

S202: Executing, by the target consensus node, the transaction to trigger a smart contract. If the transaction indicates that a new consensus node is added to the blockchain, S203 is performed; and if the transaction indicates that a consensus node is deleted from the blockchain, S205 is performed.

S203: Generating, by the target consensus node, a unique serial number of the new consensus node based on a serial number allocation rule specified by the smart contract, and storing an ID and the bound serial number of the new consensus node to a consensus node configuration list of a local consensus node information base. S204 is then performed.

For ease of understanding, description is made here by using an example: it is assumed that a serial number of a consensus node 1 is 1, a serial number of a consensus node 2 is 2, and a serial number of a consensus node N is N. After the new consensus node is added to the blockchain, a corresponding serial number of the new consensus node is N+1. In this step, the target consensus node adds the ID and the corresponding serial number "N+1" of the new consensus node to the consensus node configuration list.

S204: Reconfiguring, by the target consensus node, the other associated consensus nodes for the M local state machines. S206 is then performed.

In some embodiments, a specific association algorithm in this step is not unique, and illustrations are not made in this specification again. In addition, if required, the target consensus node may further adaptively increase a number of local state machines after a number of consensus nodes of the blockchain is increased.

S205: Deleting, by the target consensus node, an ID and a bound serial number of a consensus node from a consensus node configuration list of a local consensus node information base. S206 is then performed.

To ensure that a serial number can match a unique consensus node, the serial number corresponding to the deleted original consensus node is no longer used. For example, in the blockchain, the serial number of the consensus node 1 is 1, the serial number of the consensus node 2 is 2 . . . , and the serial number of the consensus node N is N; if the consensus node 2 is deleted, the serial number 2 is no longer used, and when a new consensus node N+1 is added to the blockchain, a serial number of the consensus node N+1 is N+1 rather than the serial number 2.

In addition, a serial number is allocated to a new consensus node according to the serial number allocation rule based on a monotonic increasing principle. Therefore, the target consensus node may locally record the latest serial number that has been used currently. Once a new consensus node is added to the blockchain, a serial number of the new consensus node may be obtained by adding 1 to the recorded latest serial number.

S206: Updating, by the target consensus node, a fault tolerance number F of the consensus nodes and a number N of the consensus nodes in a Honey Badger BFT consensus mechanism based on the triggered smart contract. S207 is then performed.

In the Honey Badger BFT consensus mechanism, it is assumed that a number of evil nodes is F, and the number N of consensus nodes needs to be greater than 3F+1. A consensus can be reached on the consensus proposal only when the consensus proposal is agreed on by N−F consensus nodes. Therefore, after the number of consensus nodes of the blockchain changes, a value of F in the Honey Badger BFT consensus mechanism needs to be adaptively updated.

S207: Processing, by the target consensus node based on the local state machines in a next round of consensus phase, consensus proposals initiated by one or more of the other consensus nodes associated with the state machines.

The state machine is configured with a state corresponding to the RBC protocol phase and a state corresponding to the BA protocol phase. A trigger condition of the control signal for the state machine to switch from the state corresponding to the RBC protocol phase to the state corresponding to the BA protocol phase includes: receiving ready messages transmitted from 2F+1 different other consensus nodes. In the Honey Badger BFT consensus mechanism, in the RBC protocol phase, each consensus node needs to reconstruct a Merkle tree for a transaction on which a consensus needs to be reached, perform verification on the reconstructed Merkle tree, and broadcast a ready message to other consensus nodes if the verification succeeds. If any target node receives ready messages transmitted from 2F+1 different other consensus nodes, it indicates that correct proposal data is received.

In some embodiments, the foregoing content is merely used for exemplarily describing the method of the embodiments of this specification. Appropriate changes can be further made without departing from the foregoing principles herein, and these changes should also be regarded as the protection scope of the embodiments of this specification.

Figure 3:
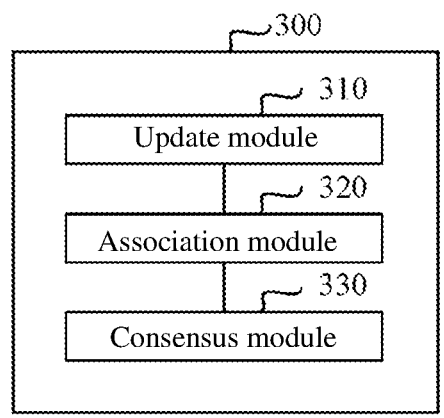
FIG. 3 is a schematic structural diagram of a consensus node changing apparatus based on a Honey Badger BFT consensus mechanism, according to some embodiments of this specification.

Corresponding to the foregoing consensus node changing method, some embodiments of this specification further provide a consensus node changing apparatus based on a Honey Badger BFT consensus mechanism. FIG. 3 is a structural diagram of the consensus node changing apparatus of the embodiments of this specification, and the apparatus includes: an update module 310, configured to: when a transaction for changing a blockchain's consensus node is received by a consensus node of the blockchain, control the consensus node of the blockchain to execute the transaction to trigger a smart contract to update a consensus node configuration list of the blockchain, where the consensus node configuration list includes serial numbers allocated to consensus nodes of the blockchain based on a serial number allocation rule specified by the smart contract; an association module 320, configured to control the consensus node of the blockchain to associate, based on serial numbers of consensus nodes recorded in the updated consensus node configuration list, other consensus nodes of the blockchain with at least two state machines locally configured in the consensus node, where each of the state machines is configured with states corresponding to a consensus phase in the Honey Badger BFT consensus mechanism and configured to perform state switching based on a control signal to perform a consensus operation specified by the consensus phase corresponding to a current state of the state machine; and a consensus module 330, configured to control the consensus node of the blockchain to process, based on the state machines that have been configured locally, a consensus proposal initiated by one or more of the other consensus nodes associated with the state machines.

Based on the consensus node changing apparatus shown in FIG. 3, in the solution of the embodiments of this specification, a unique serial number and at least two state machines are allocated to each consensus node; any target consensus node associates with local state machines based on the serial numbers of other consensus nodes and processes, by using the state machines, consensus proposals initiated by one or more of the other consensus nodes associated with the state machines, thereby implementing dynamic changes of consensus nodes without shutting down a blockchain system and ensuring availability of blockchain services.

Optionally, the update module 310, when performed, is configured to: if the transaction is used for adding a new consensus node to the blockchain, control the consensus node of the blockchain to execute the transaction to trigger the smart contract to configure a serial number of the new consensus node according to the serial number allocation rule and add information about the new consensus node to the consensus node configuration list of the blockchain, where the information about the new consensus node includes an ID and the corresponding serial number of the new consensus node; and if the transaction is used for deleting a consensus node from the blockchain, control the consensus node of the blockchain to execute the transaction to trigger the smart contract to delete information about the to-be-deleted consensus node from the consensus node configuration list of the blockchain, where the information about the to-be-deleted consensus node includes an ID and a corresponding serial number of the to-be-deleted consensus node.

According to the serial number allocation rule, the serial number is allocated, based on a monotonic increasing principle, to the new consensus node added to the blockchain, and/or the serial number corresponding to the deleted original consensus node is no longer used in the serial number allocation rule.

The consensus phase of the Honey Badger BFT consensus mechanism includes: an RBC protocol phase and a BA protocol phase to be performed after the RBC protocol phase. A trigger condition of the control signal for the state machine to switch from a state corresponding to the RBC protocol phase to a state corresponding to the BA protocol phase includes: receiving ready messages transmitted from 2F+1 different other consensus nodes, where F is a fault tolerance number of the consensus nodes in the Honey Badger BFT consensus mechanism, and the ready message is information that needs to be transmitted by a consensus node in the RBC protocol phase when a Merkle tree is reconstructed for a transaction on which a consensus needs to be reached and the reconstructed Merkle tree is successfully verified.

Optionally, the consensus node changing apparatus of the embodiments of this specification further includes: a consensus protocol configuration module configured to control the consensus node of the blockchain to execute the transaction, to trigger the smart contract to update the fault tolerance number of the consensus nodes in the Honey Badger BFT consensus mechanism.

Optionally, a number of consensus nodes in the blockchain is not less than 3, and each consensus node is configured with a number of state machines not less than 2 and not greater than a total number of the consensus nodes in the blockchain.

Optionally, the consensus node of the blockchain is locally configured with a consensus node information base, and the consensus node configuration list of the blockchain is stored in the consensus node information base.

Apparently, the consensus node changing apparatus of the embodiments of this specification may be used as an entity performing the consensus node changing method shown in FIG. 1. Therefore, the apparatus can implement functions achieved by the consensus node changing method in FIG. 1 and FIG. 2. Due to the same principle, the functions are not described herein again.

Figure 4:
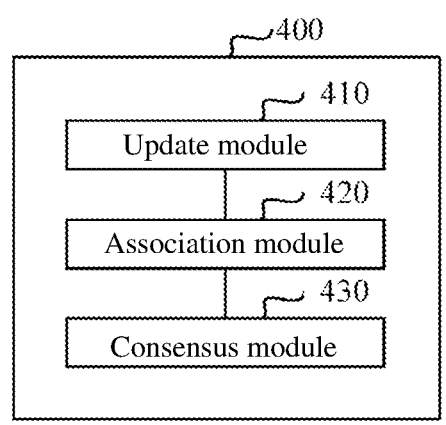
FIG. 4 is a schematic structural diagram of a consensus node based on a Honey Badger BFT consensus mechanism, according to some embodiments of this specification.

Corresponding to the consensus node changing method, some embodiments of this specification further provides a consensus node based on a Honey Badger BFT consensus mechanism. FIG. 4 is a structural diagram of the consensus node of the embodiments of this specification, and the consensus node includes: an update module 410, configured to: when a transaction for changing a blockchain's consensus node is received, execute the transaction to trigger a smart contract to update a consensus node configuration list of the blockchain, where the consensus node configuration list includes serial numbers allocated to consensus nodes of the blockchain based on a serial number allocation rule specified by the smart contract; an association module 420, configured to associate, based on serial numbers of consensus nodes recorded in the updated consensus node configuration list, other consensus nodes of the blockchain with at least two state machines locally configured in the consensus node, where each of the state machines is configured with states corresponding to a consensus phase in the Honey Badger BFT consensus mechanism and configured to perform state switching based on a control signal to perform a consensus operation specified by the consensus phase corresponding to a current state of the state machine; and a consensus module 430, configured to process, based on the state machines that have been configured locally, consensus proposals initiated by one or more of the other consensus nodes associated with the state machines.

A unique serial number and at least two state machines are allocated to the consensus node of the embodiments of this specification, so that the consensus node may associate with local state machines based on serial numbers of other consensus nodes and processes consensus proposals initiated by the other associated consensus nodes by using the state machines. After the blockchain has a consensus node changed, shutdown is not required, and in some embodiments, it is only necessary to update serial numbers of consensus nodes recorded in the consensus node configuration list according to the serial number allocation rule specified by the smart contract, and re-associate the local state machines with other consensus nodes based on the serial numbers of other consensus nodes in the updated consensus node configuration list, to ensure working of the state machines uninterrupted, thereby providing continuous blockchain services.

Optionally, the update module 410, when performed, is configured to: if the transaction is used for adding a new consensus node to the blockchain, execute the transaction to trigger the smart contract to configure a serial number of the new consensus node according to the serial number allocation rule and add information about the new consensus node to the consensus node configuration list of the blockchain, where the information about the new consensus node includes an ID and the corresponding serial number of the new consensus node; and if the transaction is used for deleting a consensus node from the blockchain, execute the transaction to trigger the smart contract to delete information about the to-be-deleted consensus node from the consensus node configuration list of the blockchain, where the information about the to-be-deleted consensus node includes an ID and a corresponding serial number of the to-be-deleted consensus node.

According to the serial number allocation rule, the serial number is allocated, based on a monotonic increasing principle, to the new consensus node added to the blockchain, and/or the serial number corresponding to the deleted original consensus node is no longer used in the serial number allocation rule.

The consensus phase of the Honey Badger BFT consensus mechanism includes: an RBC protocol phase and a BA protocol phase to be performed after the RBC protocol phase. A trigger condition of the control signal for the state machine to switch from a state corresponding to the RBC protocol phase to a state corresponding to the BA protocol phase includes: receiving ready messages transmitted from 2F+1 different other consensus nodes, where F is a fault tolerance number of the consensus nodes in the Honey Badger BFT consensus mechanism, and the ready message is information that needs to be transmitted by a consensus node in the RBC protocol phase when a Merkle tree is reconstructed for a transaction on which a consensus needs to be reached and the reconstructed Merkle tree is successfully verified.

Optionally, the consensus node of the embodiments of this specification further includes: a consensus protocol configuration module, configured to execute the transaction to trigger the smart contract to update the fault tolerance number of the consensus nodes in the Honey Badger BFT consensus mechanism.

Optionally, a number of consensus nodes in the blockchain is not less than 3, and each consensus node is configured with a number of state machines not less than 2 and not greater than a total number of the consensus nodes in the blockchain.

Optionally, the consensus node of the blockchain is locally configured with a consensus node information base, and the consensus node configuration list of the blockchain is stored in the consensus node information base.

Apparently, the consensus node of the embodiments of this specification may be used as an entity performing the consensus node changing method shown in FIG. 1. Therefore, the consensus node can implement functions achieved by the consensus node changing method in FIG. 1 and FIG. 2. Due to the same principle, the functions are not repeated herein again.

A person skilled in the art should understand that the embodiments of this specification may be provided as a method, a system, or a computer program product. Therefore, this specification may use a form of hardware only embodiments, software only embodiments, or embodiments with a combination of software and hardware. Moreover, this specification may use a form of a computer program product that is implemented on one or more computer-usable storage media (including but not limited to a disk memory, a CD-ROM, an optical memory, and the like) that include computer-usable program code.

Embodiments of this specification are described above. Other embodiments fall within the scope of the appended claims. In some embodiments, the actions or steps recorded in the claims may be performed in sequences different from those in the embodiments and an expected result may still be achieved. In addition, the processes depicted in the accompanying drawings is not necessarily performed in the specific order or successively to achieve an expected result. In some implementations, multitasking and parallel processing may be feasible or beneficial.

The foregoing descriptions are merely embodiments of this specification, and are not intended to limit this specification. For a person skilled in the art, various modifications and changes may be made to this application. Any modification, equivalent replacement, improvement, or the like made within the spirit and principle of this specification shall fall within the scope of the claims of this specification. In addition, all other embodiments obtained by a person of ordinary skill in the art without creative efforts shall fall within the protection scope of this specification.

What is claimed is:

1. A consensus node changing method, comprising:
when receiving a transaction for changing a blockchain's consensus node, executing, by a consensus node of the blockchain, the transaction to trigger a smart contract to update a consensus node configuration list of the blockchain, wherein the consensus node configuration list comprises serial numbers allocated to consensus nodes of the blockchain based on a serial number allocation rule specified by the smart contract;
associating, by the consensus node of the blockchain based on serial numbers of consensus nodes in the updated consensus node configuration list, other consensus nodes of the blockchain with at least two state machines configured in the consensus node, wherein each of the state machines is configured with states corresponding to a consensus phase in a Honey Badger Byzantine Fault Tolerance (BFT) consensus mechanism and configured to perform state switching; and
processing, by the consensus node of the blockchain based on the at least two state machines, a consensus proposal initiated by one or more of the other consensus nodes associated with the at least two state machines.

2. The method according to claim 1, wherein:
the transaction is executable for adding a new consensus node to the blockchain; and the executing, by a consensus node of the blockchain, the transaction to trigger a smart contract to update a consensus node configuration list of the blockchain comprises:
executing, by the consensus node of the blockchain, the transaction to trigger the smart contract to configure a serial number of the new consensus node according to the serial number allocation rule and add information about the new consensus node to the consensus node configuration list of the blockchain, wherein the information about the new consensus node comprises an ID (identification) and the corresponding serial number of the new consensus node.

3. The method according to claim 2, wherein:
the serial number allocation rule includes allocating monotonically increasing serial numbers.

4. The method according to claim 1, wherein:
the transaction is executable for deleting a consensus node from the blockchain; and the executing, by a consensus node of the blockchain, the transaction to trigger a smart contract to update a consensus node configuration list of the blockchain comprises:
executing, by the consensus node of the blockchain, the transaction to trigger the smart contract to delete information about the to-be-deleted consensus node from the consensus node configuration list of the blockchain, wherein the information about the to-be-deleted consensus node comprises an ID and a corresponding serial number of the to-be-deleted consensus node.

5. The method according to claim 4, wherein:
the serial number allocation rule includes not using the serial number corresponding to the deleted consensus node.

6. The method according to claim 1, wherein:
the consensus phase of the Honey Badger BFT consensus mechanism comprises: a reliable broadcast (RBC) protocol phase and a binary agreement (BA) protocol phase to be performed after the RBC protocol phase;
the state switching is based on a control signal; and
a trigger condition of the control signal for the state machine to switch from a state corresponding to the RBC protocol phase to a state corresponding to the BA protocol phase comprises: receiving ready messages transmitted from 2F+1 different other consensus nodes, wherein F is a fault tolerance number of consensus nodes in the Honey Badger BFT consensus mechanism, and the ready message is information that needs to be transmitted by a consensus node in the RBC protocol phase when a Merkle tree is reconstructed for a transaction on which a consensus needs to be reached and the reconstructed Merkle tree is successfully verified.

7. The method according to claim 6, further comprising:
executing, by the consensus node of the blockchain, the transaction to trigger the smart contract to update the fault tolerance number of consensus nodes in the Honey Badger BFT consensus mechanism.

8. The method according to claim 1, wherein:
a number of consensus nodes in the blockchain is not less than 3, and each consensus node is configured with a number of state machines not less than 2 and not greater than a total number of the consensus nodes in the blockchain.

9. The method according to claim 1, wherein:
the consensus node of the blockchain is configured with a consensus node information base, and the consensus node configuration list of the blockchain is stored in the consensus node information base.

10. One or more non-transitory computer-readable storage media storing instructions executable by one or more processors, wherein execution of the instructions causes the one or more processors to perform operations comprising:
when receiving a transaction for changing a blockchain's consensus node, executing, by a consensus node of the blockchain, the transaction to trigger a smart contract to update a consensus node configuration list of the blockchain, wherein the consensus node configuration list comprises serial numbers allocated to consensus nodes of the blockchain based on a serial number allocation rule specified by the smart contract;
associating, by the consensus node of the blockchain based on serial numbers of consensus nodes in the updated consensus node configuration list, other consensus nodes of the blockchain with at least two state machines configured in the consensus node, wherein each of the state machines is configured with states corresponding to a consensus phase in a Honey Badger Byzantine Fault Tolerance (BFT) consensus mechanism and configured to perform state switching; and
processing, by the consensus node of the blockchain based on the at least two state machines, a consensus proposal initiated by one or more of the other consensus nodes associated with the at least two state machines.

11. The one or more non-transitory computer-readable storage media according to claim 10, wherein:
the transaction is executable for adding a new consensus node to the blockchain; and the executing, by a consensus node of the blockchain, the transaction to trigger a smart contract to update a consensus node configuration list of the blockchain comprises:
executing, by the consensus node of the blockchain, the transaction to trigger the smart contract to configure a serial number of the new consensus node according to the serial number allocation rule and add information about the new consensus node to the consensus node configuration list of the blockchain, wherein the information about the new consensus node comprises an ID (identification) and the corresponding serial number of the new consensus node.

12. The one or more non-transitory computer-readable storage media according to claim 11, wherein:
the serial number allocation rule includes allocating monotonically increasing serial numbers.

13. The one or more non-transitory computer-readable storage media according to claim 10, wherein:
the transaction is executable for deleting a consensus node from the blockchain; and the executing, by a consensus node of the blockchain, the transaction to trigger a smart contract to update a consensus node configuration list of the blockchain comprises:
executing, by the consensus node of the blockchain, the transaction to trigger the smart contract to delete information about the to-be-deleted consensus node from the consensus node configuration list of the blockchain, wherein the information about the to-be-deleted consensus node comprises an ID and a corresponding serial number of the to-be-deleted consensus node.

14. The one or more non-transitory computer-readable storage media according to claim 13, wherein:
the serial number allocation rule includes not using the serial number corresponding to the deleted consensus node.

15. The one or more non-transitory computer-readable storage media according to claim 10, wherein:
the consensus phase of the Honey Badger BFT consensus mechanism comprises: a reliable broadcast (RBC) protocol phase and a binary agreement (BA) protocol phase to be performed after the RBC protocol phase;
the state switching is based on a control signal; and
a trigger condition of the control signal for the state machine to switch from a state corresponding to the RBC protocol phase to a state corresponding to the BA protocol phase comprises: receiving ready messages transmitted from 2F+1 different other consensus nodes, wherein F is a fault tolerance number of consensus nodes in the Honey Badger BFT consensus mechanism, and the ready message is information that needs to be transmitted by a consensus node in the RBC protocol phase when a Merkle tree is reconstructed for a transaction on which a consensus needs to be reached and the reconstructed Merkle tree is successfully verified.

16. The one or more non-transitory computer-readable storage media according to claim 15, wherein the operations further comprise:

executing, by the consensus node of the blockchain, the transaction to trigger the smart contract to update the fault tolerance number of consensus nodes in the Honey Badger BFT consensus mechanism.

17. The one or more non-transitory computer-readable storage media according to claim 10, wherein:
a number of consensus nodes in the blockchain is not less than 3, and each consensus node is configured with a number of state machines not less than 2 and not greater than a total number of the consensus nodes in the blockchain.

18. The one or more non-transitory computer-readable storage media according to claim 10, wherein:
the consensus node of the blockchain is configured with a consensus node information base, and the consensus node configuration list of the blockchain is stored in the consensus node information base.

19. A system comprising one or more processors and one or more non-transitory computer-readable memories coupled to the one or more processors and configured with instructions executable by the one or more processors to cause the system to perform operations comprising:
when receiving a transaction for changing a blockchain's consensus node, executing, by a consensus node of the blockchain, the transaction to trigger a smart contract to update a consensus node configuration list of the blockchain, wherein the consensus node configuration list comprises serial numbers allocated to consensus nodes of the blockchain based on a serial number allocation rule specified by the smart contract;
associating, by the consensus node of the blockchain based on serial numbers of consensus nodes in the updated consensus node configuration list, other consensus nodes of the blockchain with at least two state machines configured in the consensus node, wherein each of the state machines is configured with states corresponding to a consensus phase in a Honey Badger Byzantine Fault Tolerance (BFT) consensus mechanism and configured to perform state switching; and
processing, by the consensus node of the blockchain based on the at least two state machines, a consensus proposal initiated by one or more of the other consensus nodes associated with the at least two state machines.

20. The system according to claim 19, wherein:
the serial number allocation rule includes not using the serial number corresponding to the deleted consensus node.

* * * * *